US012645485B2

(12) United States Patent
Sherwin, Jr. et al.

(10) Patent No.: US 12,645,485 B2
(45) Date of Patent: Jun. 2, 2026

(54) POWER-MANAGEMENT VIRTUAL MACHINES

(71) Applicant: Microsoft Technology Licensing, LLC, Redmond, WA (US)

(72) Inventors: Bruce J. Sherwin, Jr., Woodinville, WA (US); Xin David Zhang, Duvall, WA (US); Yimin Deng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 389 days.

(21) Appl. No.: 18/302,652

(22) Filed: Apr. 18, 2023

(65) Prior Publication Data

US 2024/0354138 A1 Oct. 24, 2024

(51) Int. Cl.
*G06F 9/455* (2018.01)

(52) U.S. Cl.
CPC ........ *G06F 9/45558* (2013.01); *G06F 9/4555* (2013.01); *G06F 2009/4557* (2013.01)

(58) Field of Classification Search
CPC .............. G06F 9/45558; G06F 9/4555; G06F 2009/4557; G06F 1/3287; G06F 2009/45579
See application file for complete search history.

(56) References Cited

U.S. PATENT DOCUMENTS 8,695,007 B2 4/2014 Wada et al.
2007/0255936 A1* 11/2007 Stemen ................. G06F 9/4411
713/2

2010/0162242 A1* 6/2010 Grouzdev ............. G06F 9/4411
718/1
2012/0278800 A1 11/2012 Nicholas
2014/0183957 A1 7/2014 Duchesneau
2014/0298340 A1* 10/2014 Imaizumi ........... G06F 12/0284
718/1
2015/0347166 A1 12/2015 Noel et al.
(Continued)

OTHER PUBLICATIONS

Chen et al., "ClientVisor: Leverage COTS OS Functionalities for Power Management in Virtualized Desktop Environment", Operating Systems Review, ACM, New York, NY, US, vol. 43, No. 3, Jul. 31, 2009, pp. 62-71.

(Continued)

*Primary Examiner* — Dong U Kim
(74) *Attorney, Agent, or Firm* — Workman Nydegger

(57) ABSTRACT

Method, systems, and computer program products for managing a processor power management feature on behalf of a virtual machine (VM). A device may determine that a VM operating at a computer system possesses a power management entitlement. The device may identify an architectural power management feature available at a physical processor core of a processor system. The physical processor core is associated with a virtual processor core of the VM. Based on the VM possessing the power management entitlement, the device may present an interface to the VM. The interface exposes the architectural power management feature to the VM. The device may identify a request from the VM to modify a state of the architectural power management feature. Based on the request, the device may modify the state of the architectural power management feature at the physical processor core.

17 Claims, 4 Drawing Sheets

(56) References Cited

U.S. PATENT DOCUMENTS

| | | | |
|---|---|---|---|
| 2016/0239324 A1* | 8/2016 | Tsirkin | G06F 21/54 |
| 2018/0365042 A1* | 12/2018 | Tsirkin | G06F 9/45533 |
| 2019/0278714 A1 | 9/2019 | Poothia | |
| 2020/0104128 A1 | 4/2020 | Opferman | |
| 2020/0341791 A1 | 10/2020 | Tsirkin | |
| 2020/0401440 A1 | 12/2020 | Sankaran | |
| 2021/0096896 A1 | 4/2021 | Das | |
| 2021/0216344 A1 | 7/2021 | Tsirkin | |
| 2021/0279107 A1 | 9/2021 | Qu | |
| 2021/0342173 A1* | 11/2021 | Tsirkin | G06F 9/4812 |
| 2022/0004420 A1 | 1/2022 | Warkentin | |
| 2022/0113785 A1 | 4/2022 | Lu | |
| 2022/0156362 A1 | 5/2022 | Takahashi | |
| 2022/0164196 A1 | 5/2022 | Beckett | |
| 2023/0342477 A1 | 10/2023 | Babu | |
| 2024/0220446 A1 | 7/2024 | Kirubakaran | |
| 2024/0354139 A1 | 10/2024 | Sherwin, Jr. | |
| 2024/0354140 A1 | 10/2024 | Sherwin, Jr. | |

OTHER PUBLICATIONS

International Search Report and Written Opinion received for PCT Application No. PCT/US2024/023489, Jun. 27, 2024, 17 pages.

International Search Report and Written Opinion received for PCT Application No. PCT/US2024/023490, Jul. 15, 2024, 15 pages.

International Search Report and Written Opinion received for PCT Application No. PCT/US2024/023515, Jul. 4, 2024, 12 pages.

Nathuji, et al., "Virtualpower: Coordinated Power Management in Virtualized Enterprise Systems," Operating Systems Review, ACM, New York, NY, US, vol. 41, No. 6, Oct. 14, 2007, pp. 265-278.

Tang, et al.,"Demeter QoS-aware CPU scheduling to reduce power consumption of multiple black-box workloads," Proceedings of the 13th Symposium on Cloud Computing, Nov. 7, 2022, pp. 31-46.

Yang et al., "Implementation of a Green Power Management Algorithm for Virtual Machines on Cloud Computing", Sep. 2, 2011, SAT 2015, 18th International Conference, Austin, TX, USA, Lecture Notes in Computer Science, Springer, Berlin, Heidelberg, Sep. 24-27, 2015, pp. 280-294.

International Preliminary Report on Patentability (Chapter I) received for PCT Application No. PCT/US2024/023515, Oct. 30, 2025, 9 pages.

International Preliminary Report on Patentability (Chapter I/II) received for PCT Application No. PCT/US2024/023490, Oct. 30, 2025, 9 pages.

International Preliminary Report On Patentability received for PCT Application No. PCT/US2024/023489, mailed on Oct. 30, 2025, 10 pages.

Non-Final Office Action mailed on Sep. 19, 2025, in U.S. Appl. No. 18/302,706, 38 Pages.

Non-Final Office Action mailed on Nov. 5, 2025, in U.S. Appl. No. 18/302,707, 12 Pages.

Final Office Action mailed on Jan. 28, 2026, in U.S. Appl. No. 18/302,706, 41 Pages.

Notice of Allowance mailed on Mar. 3, 2026, in U.S. Appl. No. 18/302,707, 06 Pages.

* cited by examiner

100a

200

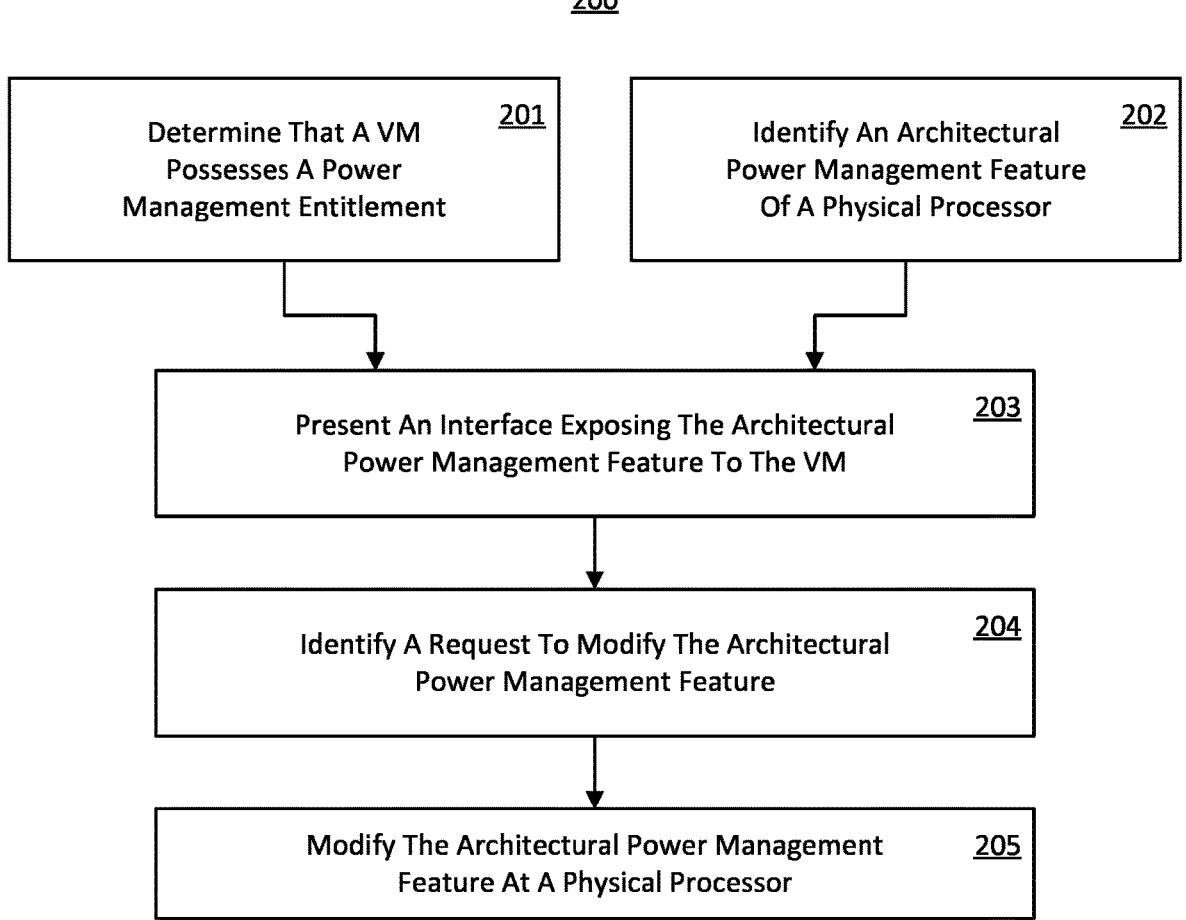

Determine That A VM Possesses A Power Management Entitlement _201_

Identify An Architectural Power Management Feature Of A Physical Processor _202_

Present An Interface Exposing The Architectural Power Management Feature To The VM _203_

Identify A Request To Modify The Architectural Power Management Feature _204_

Modify The Architectural Power Management Feature At A Physical Processor _205_

*FIG. 2*

POWER-MANAGEMENT VIRTUAL MACHINES

BACKGROUND OF THE INVENTION

Modern central processing units (CPUs), or processors, support a variety of processor power management technologies that can be used to balance performance, power consumption, and heat generation, among other things.

For example, modern CPUs support a variety of processor idle states, which reduce CPU power consumption and heat generation when the CPU is idle (e.g., not actively executing instructions). For example, the Advanced Configuration and Power Interface (ACPI) specification defines a variety of processor idle states, known as "C-states" (sometimes referred to as "C-modes"), as well as interfaces that an operating system (OS) can use to instruct a CPU to enter various C-states. C-states are states when the CPU has reduced or turned off selected functions. Different processors support different numbers of C-states in which various parts of the CPU are turned off. Generally, a higher-numbered C-state is a "deeper" idle state that turns off more parts of the CPU, while a lower-numbered C-state is a "lighter" idle state that turns off fewer parts of the CPU. Deeper idle states can significantly reduce power consumption by the CPU, as compared to lighter idle states. While the C-states implemented by a given CPU may vary, some basic C-states defined by the ACPI specification, and supported by most contemporary processors, are outlined in Table 1:

TABLE 1

| State | Known As | Description |
| --- | --- | --- |
| C0 | Operating State | The CPU is fully turned on |
| C1 | Halt | The CPU processor is not executing instructions, but it can return to an executing state essentially instantaneously. This state stops CPU main internal clocks via software while a bus interface unit and an advanced programmable interrupt controller (APIC) are kept running at full speed |
| C2 | Stop-Clock | The CPU maintains all software-visible state but may take longer to wake up. This state stops CPU main internal clocks via software and reduces CPU voltage while the bus interface unit and APIC are kept running at full speed |
| C3 | Sleep | The CPU does not need to keep its cache coherent but maintains other state. Some CPUs have variations on the C3 state (Deep Sleep, Deeper Sleep, etc.) that differ in how long it takes to wake the processor. This state stops all CPU internal clocks. |

Some processor manufacturers define additional C-states, which may vary by processor model. For example, contemporary processors from INTEL CORPORATION of Santa Clara, California, have C-states up to C10, where the processor distinguishes core states (e.g., states of individual CPU cores) and package states (e.g., groupings of CPU cores within the same processor package).

Many modern CPUs also support dynamic frequency scaling technologies, which adjust the clock frequency of a CPU depending on processing needs. The use of dynamic frequency scaling technologies can conserve power and reduce the amount of heat generated by the CPU. Dynamic frequency scaling technologies come in power-saving and performance-boosting forms. In power-saving forms, the processor operates at a base clock rate but can be throttled to lower clock rates (e.g., when power resources are constrained, during periods of reduced workload demands).

Example power-saving technologies include SPEED STEP from INTEL, and COOL'N'QUIET and POWERNOW! from ADVANCED MICRO DEVICES, INC. (AMD) of Santa Clara, California. In performance-boosting forms, the processor operates at a base clock rate but can "boost" to higher clock rates (e.g., during periods of increased workload demands, and when thermal conditions permit). Examples include TURBO BOOST from INTEL and TURBO CORE from AMD.

Many modern CPUs also support overclocking, in which the clock rate of a CPU is increased to exceed a clock rate recommended or certified by the manufacturer. While overclocking can lead to improved performance, it comes with increased power consumption and heat generation, a risk of unstable behavior, and a shortened CPU lifespan.

Additionally, hypervisor-based virtualization technologies allocate portions of a computer system's physical resources (e.g., processor cores, physical memory regions, storage resources) into separate partitions and execute software within each partition. Hypervisor-based virtualization technologies, therefore, facilitate the creation of virtual machines (VMs) that each executes guest software, such as an OS and other software executing therein. A computer system hosting VMs is commonly called a VM host (sometimes called a "VM host node"). While hypervisor-based virtualization technologies can take a variety of forms, many use an architecture comprising a hypervisor that has direct access to hardware, and that operates in a separate execution environment from all other software in the system, a host partition that executes a host OS and a host virtualization stack, and one or more guest partitions corresponding to VMs. The host virtualization stack within the host partition manages guest partitions. Thus, the hypervisor grants the host partition a greater level of access to the hypervisor itself and to hardware resources than it does to guest partitions.

Virtualization service providers operate a plurality of VM hosts to provide VM hosting services to a plurality of tenants. In doing so, virtualization service providers may collocate VMs from a plurality of tenants at a single VM host. Examples of virtualization service providers include AZURE operated by MICROSOFT CORPORATION of Redmond, Washington; AMAZON WEB SERVICES (AWS) operated by AMAZON, INC. Seattle, Washington; and GOOGLE CLOUD PLATFORM (GCP) operated by GOOGLE LLC of Mountain View, California.

The subject matter claimed herein is not limited to embodiments that solve any disadvantages or that operate only in environments such as those described above. Rather, this background is only provided to illustrate one example technology area where some embodiments described herein may be practiced.

SUMMARY OF THE INVENTION

In some aspects, the techniques described herein relate to methods, systems, and computer program products, including determining that a virtual machine (VM) operating at a computer system possesses a power management entitlement; identifying an architectural power management feature available at a physical processor core of a processor system, the physical processor core being associated with a virtual processor core of the VM; based on the VM possessing the power management entitlement, presenting an interface to the VM, the interface exposing the architectural power management feature to the VM; identifying a request from the VM to modify a state of the architectural power management feature; and based on the request, modifying the state of the architectural power management feature at the physical processor core.

In some aspects, the techniques described herein relate to methods, systems, and computer program products, including: determining that a VM operating at a computer system possesses a power management entitlement; identifying an architectural power management feature available at a physical processor core of a processor system, the physical processor core being associated with a virtual processor core of the VM; based on the VM possessing the power management entitlement, presenting a para-virtual service to the VM, the para-virtual service presenting an application programming interface (API) enabling a para-virtual driver operating at the VM to make API calls to manage the architectural power management feature; at the para-virtual service, identifying an API call from the para-virtual driver, the API call requesting a modification to a state of the architectural power management feature; and based on identifying the API call from the para-virtual driver, modifying the state of the architectural power management feature at the physical processor core.

In some aspects, the techniques described herein relate to methods, systems, and computer program products, including: determining that a VM operating at a computer system possesses a power management entitlement; identifying an architectural power management feature available at a physical processor core of a processor system, the physical processor core being associated with a virtual processor core of the VM; based on the VM possessing the power management entitlement, presenting an interface to the VM, the interface exposing the architectural power management feature to the VM as an architectural feature of the virtual processor core; identifying a modification by the VM to a state of the architectural feature of the virtual processor core; and based on the modification to the state of the architectural feature of the virtual processor core, modifying a state of the architectural power management feature at the physical processor core.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF DRAWINGS

To describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which:

FIG. 2 illustrates a flow chart of an example method for managing a processor power management feature on behalf of a VM.

DETAILED DESCRIPTION OF THE INVENTION

Hypervisors generally prohibit virtual machines (VMs) from configuring power management technologies (e.g., processor idle states, dynamic frequency scaling, overclocking) at VM host processors. This prevents VM host processors from being placed by a VM into unknown or undesirable power and/or performance states, and protects VM host processors from potential instability, excessive heat generation, and/or damage (e.g., due to overclocking). Additionally, for virtualization host providers, this ensures that the virtualization host provider retains control over managing a balance between VM power consumption and VM performance.

Despite these advantages of prohibiting VMs from configuring power management technologies at VM host processors, it is often desirable for virtualization host providers to let VMs do so under regulated conditions. Accordingly, at least some embodiments described herein expose power management technologies to VMs possessing an entitlement (e.g., a power management entitlement) and enable those VMs to modify processor-based settings relating to those power management technologies at VM host processors (e.g., the VM host processor(s) to which a VM's virtual processor(s) are associated).

Enabling VMs to configure power management technologies at VM host processors under regulated conditions provides a number of advantages. One advantage is that a VM operator may choose to reduce energy consumption by the VM by enabling power-saving features at the VM. Another advantage is that a VM operator may be able to boost performance at a virtual processor under the tenant's control by enabling power-saving features at another virtual processor under the tenant's control. For instance, if the virtual processors are associated with physical processors that are thermally linked (e.g., part of the same processor package), enabling power-saving features at one physical processor may reduce heat generation by that physical processor and enable the other virtual processor to better utilize dynamic frequency scaling technologies (e.g., TURBO BOOST). Another advantage is that the VM operator may be able to ensure consistent performance at a virtual processor and/or limit compute usage by the virtual processor, by disabling dynamic frequency scaling technologies (e.g., TURBO BOOST) at an associated physical processor.

Figure 1A:
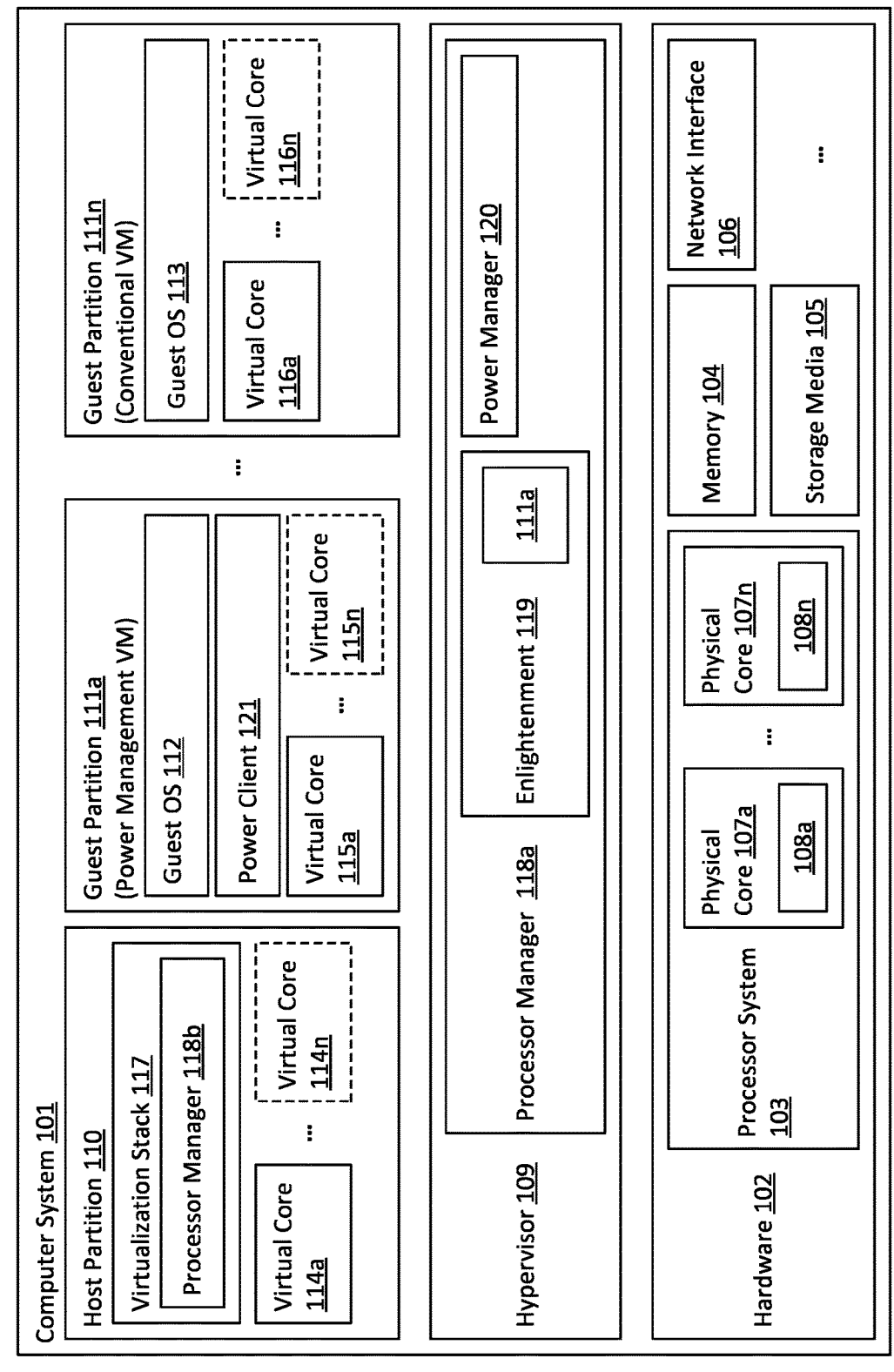
FIG. 1A illustrates an example computer architecture that facilitates managing a processor power management feature on behalf of a virtual machine (VM)

FIG. 1A illustrates an example 100a of a computer architecture that facilitates managing a processor power management feature on behalf of a VM. In example 100a, the computer architecture includes a computer system 101 comprising hardware 102. An illustrated example of hardware 102 includes a processor system 103. In embodiments, processor system 103 is a single central processing unit (CPU) comprising one or more processors (e.g., CPU cores) or a plurality of CPUs which each includes one or more cores. Regardless of the arrangement of processor system 103, in FIG. 1A, processor system 103 includes a plurality of CPU cores, illustrated as physical cores 107 (e.g., physical core 107a to physical core 107n, with an ellipsis indicating that there could be any number of physical cores 107). For example, each of physical cores 107 is a single-threaded physical core or is one thread of a simultaneous multithreading (SMT) physical core.

Illustrated examples of hardware 102 also include a memory 104 (e.g., system or main memory), a storage media 105 (e.g., a single computer-readable storage medium or a plurality of computer-readable storage media), and a network interface 106 (e.g., one or more network interface cards). Although not shown, other examples of hardware 102 include a trusted platform module (TPM) for facilitating measured boot features, an input/output (I/O) memory management unit (IOMMU) that connects a direct memory access (DMA)-capable I/O bus (and any devices connected thereto) to memory 104, a graphics processing unit (GPU) for rendering image data, a video display interface for connecting to display hardware, a user input interface for connecting to user input devices, an external bus for connecting to external devices, and the like.

As illustrated in example 100a, a hypervisor 109 executes directly on hardware 102. In general, hypervisor 109 partitions hardware resources (e.g., processor system 103, memory 104, I/O resources) into a plurality of partitions. In embodiments, these partitions include a host partition 110 within which a host OS (not illustrated) executes. In embodiments, these partitions also include guest partitions 111 within which guest OSs execute (e.g., guest partition 111a executing guest OS 112 to guest partition 111n executing guest OS 113, with an ellipsis indicating that hypervisor 109 could operate any number of guest partitions).

As illustrated, host partition 110 includes a virtualization stack 117, which uses application program interface (API) calls (e.g., hypercalls) to hypervisor 109 to create, manage, and destroy guest partitions 111. In embodiments, virtualization stack 117 makes decisions about which portion(s) of memory 104 to allocate to each guest partition, operates para-virtual drivers that multiplex guest partition access to physical hardware devices (e.g., storage media 105, network interface 106), and facilities limited communications among partitions via a VM bus, among other things.

In embodiments, hypervisor 109 creates one or more virtual processors for each partition. For example, FIG. 1A illustrates host partition 110 as including virtual cores 114 (e.g., virtual core 114a to virtual core 114n, with an ellipsis indicating that there could be any number of virtual cores 114), illustrates guest partition 111a as including virtual cores 115 (e.g., virtual core 115a to virtual core 115n, with an ellipsis indicating that there could be any number of virtual cores 115), and illustrates guest partition 111n as including virtual cores 116 (e.g., virtual core 116a to virtual core 116n, with an ellipsis indicating that there could be any number of virtual cores 116). In embodiments, hypervisor 109 uses a processor manager 118 to manage the use of processor system 103 (e.g., physical cores 107) by these virtual processors. In embodiments, hypervisor 109 coordinates with virtualization stack 117 in managing the use of processor system 103 by virtual processors. Thus, in FIG. 1A, processor manager 118 is illustrated as being split between hypervisor 109 (processor manager 118a) and virtualization stack 117 (processor manager 118b) to indicate that, in some examples, the functionality of processor manager 118 is split among virtualization stack 117 and hypervisor 109.

In embodiments, hypervisor 109 also allocates a portion of memory 104 to each partition and intercepts and routes any interrupts generated by each partition, among other things. In embodiments, hypervisor 109 uses second-level address translation (SLAT) to isolate memory allocated to each partition created by hypervisor 109 from other partition(s) created by hypervisor 109. For example, hypervisor 109 may use one or more SLAT tables to map system physical addresses (SPAs) in memory 104 to guest physical addresses (GPAs) that make up each partition's memory space.

In embodiments, each physical core of physical cores 107 supports one or more power management technologies, such as idle states, dynamic frequency scaling, overclocking, and the like. In some embodiments, the configuration of these power management technologies is controlled on a per-package basis, a per-core basis, etc. In one example, power management technologies are configured for a physical core by writing to a processor register at that core. In FIG. 1A, a configuration of one or more power management technologies at each physical core of physical cores 107 is denoted by power settings 108 (e.g., power setting 108a for physical core 107a to power setting 108n for physical core 107n).

In embodiments, any guest partition of guest partitions 111 can be granted a power management entitlement, such as an entitlement as being a "power management" VM that is enabled to see and modify one or more power management technologies at physical cores 107. In FIG. 1A, an enlightenment component 119 stores or otherwise accesses (e.g., from virtualization stack 117) a set of enlightenments that specify which guest partition(s) possess a power management entitlement. In embodiments, enlightenments are granted or otherwise configured by an administrator (e.g., a virtualization service provider) of computer system 101. In FIG. 1A, enlightenment component 119 has determined that guest partition 111a possesses a power management entitlement, and thus guest partition 111a is indicated as being a power management VM. In contrast, enlightenment component 119 has determined that guest partition 111n lacks a performance entitlement, and thus guest partition 111n is indicated as being a conventional VM.

In embodiments, processor manager 118 exposes power management technologies of one or more physical cores of physical cores 107 to one or more guest partitions (e.g., guest partition 111a) of guest partitions 111 that possess a power management entitlement. In embodiments, processor manager 118 enables guest partition(s) with this entitlement to read and modify power settings 108 relating to those power management technologies.

In FIG. 1A, processor manager 118 is illustrated as including a power manager 120, while guest partition 111a is illustrated as including a power client 121. In embodiments, power manager 120 identifies power management features available at physical cores 107, such as idle state features, frequency scaling features, overclocking features, and the like. In embodiments, power manager 120 exposes these power management features, including their settings, to power client 121. Correspondingly, in embodiments, power client 121 receives power management features and their settings from power manager 120 and communicates requests to modify those settings to power manager 120. The forms of power manager 120 and power client 121 can vary, depending on implementation. Examples are now described in connection with FIG. 1B to FIG. 1C.

Figure 1B:
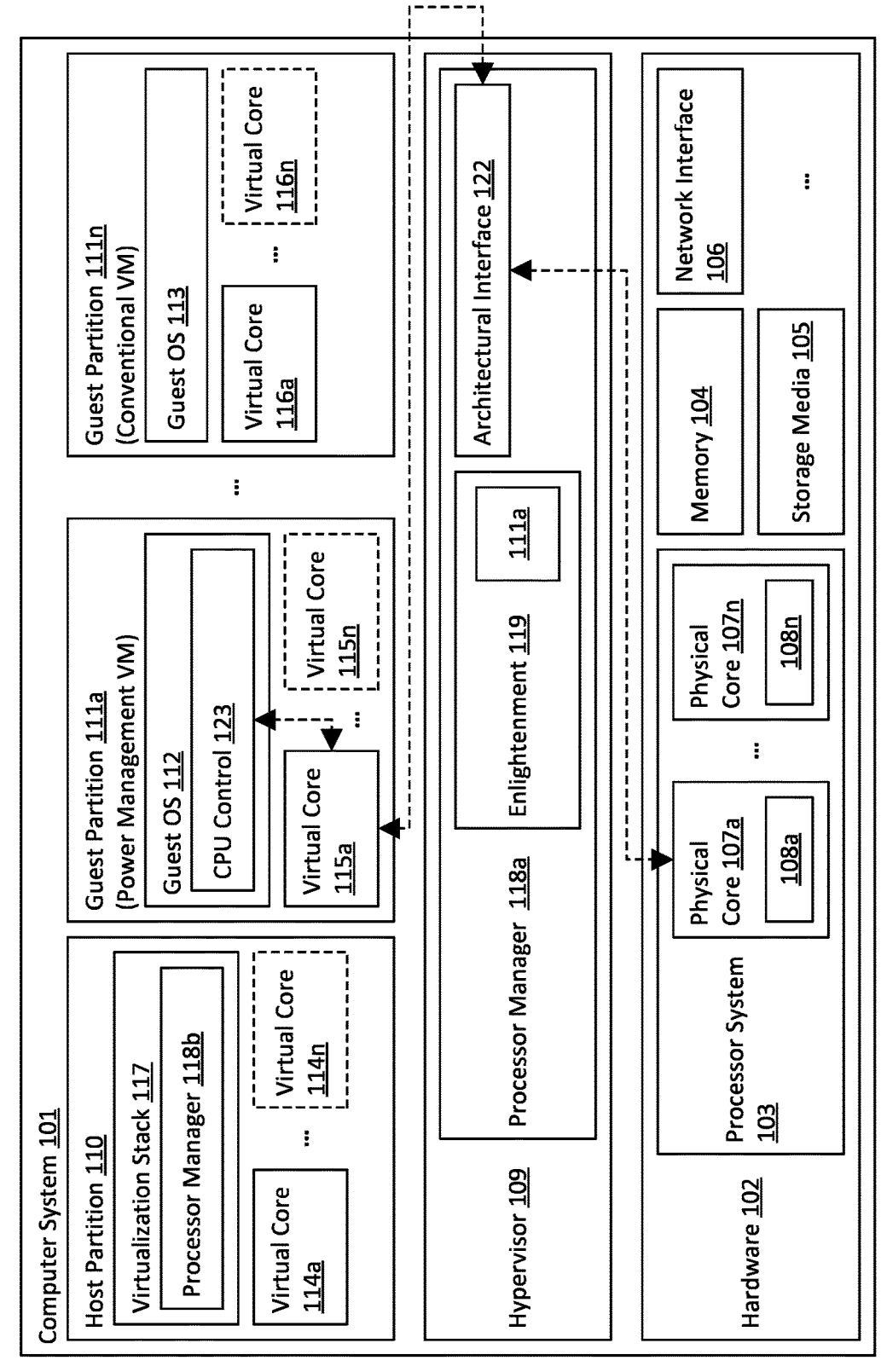
FIG. 1B illustrates an example computer architecture that exposes power management architectural interfaces to a VM via a virtual processor.

Turning to FIG. 1B, illustrated is an example 100b of a computer architecture that exposes power management architectural interfaces to a VM via a virtual processor. In example 100b, power manager 120 is an architectural interface 122 that exposes one or more power management features of a physical core via a virtual core. Thus, in these embodiments, the virtual core is the power client 121. For instance, in example 100b, architectural interface 122 exposes power management feature(s) of physical core 107a to guest partition 111*a* via virtual core 115*a*. In embodiments, a CPU control component 123 of guest OS 112 reads power setting 108*a* for physical core 107*a* via virtual core 115*a* (e.g., by reading from a processor register at virtual core 115*a*) and modifies power setting 108*a* via interactions with virtual core 115*a* (e.g., by writing to a processor register at virtual core 115*a*).

In some embodiments, architectural interface 122 exposes all power management features of a physical core. In other embodiments, architectural interface 122 exposes a subset of power management features of a physical core, thereby limiting a power management VM's ability to interact with the physical core's management features. Thus, in some embodiments, architectural interface 122 filters which power management features are available to a power management VM.

It is noted that, in embodiments, because CPU control component 123 at guest OS 112 can directly configure power setting 108*a* (via interacting with virtual core 115*a*), it may be possible for guest partition 111*a* to place power setting 108*a* into a state that is not reversible by hypervisor 109 without a reset of physical core 107*a*.

Figure 1C:
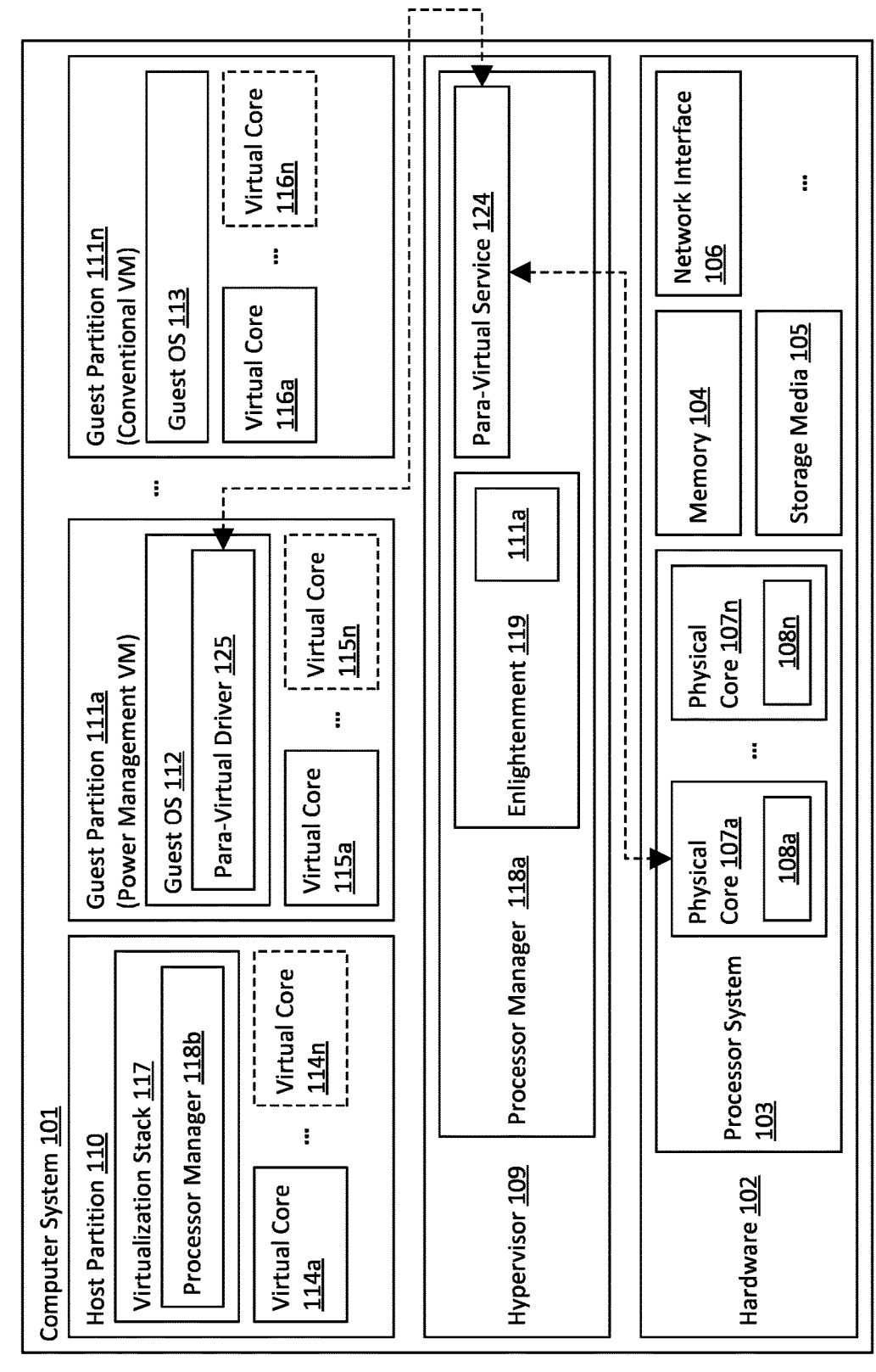
FIG. 1C illustrates an example computer architecture that directly exposes power management features of a physical processor to a VM via a para-virtual service.

Turning to FIG. 1C, illustrated is an example 100*c* of a computer architecture that exposes power management architectural interfaces to a VM via an API. In one embodiment, this API is presented by a para-virtual service. In general, para-virtual services present software interface VMs that operate corresponding para-virtual drivers. Such VMs are thus "enlightened" to be aware that they are operating in a virtualized environment. In example 100*c*, power manager 120 is a para-virtual service 124 that exposes one or more power management features of a physical core via a set of APIs, and power client 121 is a para-virtual driver 125 that interacts with the APIs of para-virtual service 124. For instance, in example 100*c*, para-virtual service 124 exposes power management feature(s) of physical core 107*a* to para-virtual driver 125 operating at guest partition 111*a*. In embodiments, para-virtual driver 125 interacts with para-virtual service 124 via calls (e.g., hypercalls) to a set of APIs presented by para-virtual service 124.

In embodiments, para-virtual driver 125 makes API call(s) requesting the power management feature(s) available at physical core 107*a*, and para-virtual service 124 returns those power management feature(s). In embodiments, para-virtual driver 125 makes API call(s) requesting the parameter(s) available for a given power management feature, and para-virtual service 124 returns those parameter(s). In embodiments, para-virtual driver 125 makes API call(s) requesting a modification to a power management feature, and para-virtual service 124 enacts that change at power setting 108*a*.

Notably, in embodiments of example 100*c*, hypervisor 109 remains in control of changes to power settings 108. Thus, for example, hypervisor 109 can prevent certain changes from being made by a power management VM. In some embodiments, para-virtual service 124 tracks changes made by power management VMs and can use this tracked data to revert changes made by power management VMs. For example, para-virtual service 124 tracks modifications to power setting 108*a* made based on requests from para-virtual driver 125 and thus can revert those modifications (e.g., in response to physical core 107*a* being disassociated from power setting 108*a*).

In some embodiments, para-virtual service 124 exposes all power management features of a physical core. In other embodiments, para-virtual service 124 exposes a subset of power management features of a physical core, thereby limiting a power management VM's ability to interact with the physical core's management features. Thus, in some embodiments, para-virtual service 124 filters which power management features are available to a power management VM.

Embodiments are now described in connection with FIG. 2, which illustrates a flow chart of an example method 200 for managing a processor power management feature on behalf of a VM. In embodiments, instructions for implementing method 200 are encoded as computer-executable instructions (e.g., representing processor manager 118*a*) stored on a computer storage media (e.g., storage media 105) that are executable by a processor system (e.g., processor system 103) to cause a computer system (e.g., computer system 101) to perform method 200.

The following discussion now refers to a number of methods and method acts. Although the method acts may be discussed in certain orders or may be illustrated in a flow chart as occurring in a particular order, no particular ordering is required unless specifically stated, or required because an act is dependent on another act being completed prior to the act being performed.

Referring to FIG. 2, in embodiments, method 200 comprises an act 201 of determining that a VM possesses a power management entitlement. In some embodiments, act 201 comprises determining that a VM operating at the computer system possesses a power management entitlement. In an example, using enlightenment component 119, processor manager 118 determines that guest partition 111*a* possesses a power management entitlement. Thus, guest partition 111*a* corresponds to a power management VM.

Method 200 also comprises an act 202 of identifying an architectural power management feature of a physical processor. In some embodiments, act 202 comprises identifying an architectural power management feature available at a physical processor core of the processor system, the physical processor core being associated with a virtual processor core of the VM. In an example, based on an association between virtual core 115*a* and physical core 107*a*, power manager 120 identifies which power management feature(s) are available at physical core 107*a*.

In embodiments, the architectural power management feature is one of an idle state feature, a frequency scaling feature, or an overclocking feature. In some embodiments, identifying the architectural power management feature of the physical processor comprises identifying a plurality of architectural power management features. In these embodiments, the plurality of architectural power management features includes a combination of an idle state feature, a frequency scaling feature, and/or an overclocking feature.

Notably, in FIG. 2, there is no ordering specified between act 201 and act 202. Thus, in embodiments, act 201 and act 202 could be performed serially (in either order) or at least partially in parallel.

After act 201 and act 202, method 200 also comprises an act 203 of presenting an interface exposing the architectural power management feature to the VM. In some embodiments, act 203 comprises, based on the VM possessing the power management entitlement, presenting an interface to the VM, the interface exposing the architectural power management feature to the VM. In an example, processor manager 118 presents power manager 120 to guest partition 111*a*. Power manager 120 exposes available power management features at physical core 107*a* to guest partition 111*a* and enables guest partition 111*a* to modify power setting 108*a* relating to those power management features.

As described in connection with FIG. 1A to FIG. 1C, the nature of power manager 120 can vary depending on implementation. Examples include architectural interface 122 and para-virtual service 124.

As demonstrated in example 100b, in some embodiments, presenting the interface to the VM comprises presenting the architectural power management feature to the VM as an architectural feature of the virtual processor core. For instance, in example 100b, architectural interface 122 exposes a power management feature to guest partition 111a via virtual core 115a. Thus, in some embodiments, act 203 comprises, based on the VM possessing the power management entitlement, presenting an interface to the VM, the interface exposing the architectural power management feature to the VM as an architectural feature of the virtual processor core.

As demonstrated in example 100c, in some embodiments, presenting the interface to the VM comprises presenting a para-virtual service to the VM. For instance, in example 100c, processor manager 118 exposes para-virtual service 124 to guest partition 111a, which exposes a set of APIs to para-virtual driver 125 operating at guest OS 112. Thus, in some embodiments, act 203 comprises, based on the VM possessing the power management entitlement, presenting a para-virtual service to the VM, the para-virtual service presenting an API enabling a para-virtual driver operating at the VM to make API calls to manage the architectural power management feature.

In embodiments, a set of APIs presented by para-virtual service 124 enable para-virtual driver 125 to discover available power management features, and their parameters, and to request modifications. Thus, in embodiments of act 203, presenting the para-virtual service to the VM comprises exposing an API to the VM, the API enabling a para-virtual driver operating at the VM to discover the availability of the architectural power management feature. Additionally, in embodiments of act 203, presenting the para-virtual service to the VM comprises exposing an API to the VM, the API enabling a para-virtual driver operating at the VM to discover a parameter of the architectural power management feature. Additionally, in embodiments of act 203, presenting the para-virtual service to the VM comprises exposing an API to the VM, the API enabling a para-virtual driver operating at the VM to request a modification to a state of the architectural power management feature (e.g., changing a parameter of the architectural power management feature).

Method 200 also comprises an act 204 of identifying a request to modify the architectural power management feature. In some embodiments, act 204 comprises identifying a request from the VM to modify a state of the architectural power management feature. For example, power manager 120 receives a request from power client 121 to modify a state of a power management feature. As described in connection with FIG. 1A to FIG. 1C, the nature of this request can vary depending on implementation.

As demonstrated in example 100b, in some embodiments identifying the request from the VM to modify the state of the architectural power management feature comprises identifying a modification by the VM to a state of the architectural feature of the virtual processor core. For instance, in example 100b, architectural interface 122 identifies a write to a register at virtual core 115a. Thus, in some embodiments, act 204 comprises identifying a modification by the VM to a state of the architectural feature of the virtual processor core.

As demonstrated in example 100c, in some embodiments identifying the request from the VM to modify the state of the architectural power management feature comprises identifying an API call from the para-virtual driver to the para-virtual service. For instance, in example 100c, para-virtual service 124 identifies an API request (e.g., a hyper-call) from para-virtual driver 125 that requests a modification to power setting 108a. Thus, in some embodiments, act 204 comprises, at the para-virtual service, identifying an API call from the para-virtual driver, the API call requesting a modification to a state of the architectural power management feature.

Method 200 also comprises an act 205 of modifying the architectural power management feature at a physical processor. In some embodiments, act 205 comprises, based on the request, modifying the state of the architectural power management feature at the physical processor core. In an example, power manager 120 enacts the requested modification at power setting 108a of physical core 107a. Thus, via power manager 120, guest partition 111a has modified a setting for a power management feature at physical core 107a.

Referring to example 100b, in embodiments when act 204 comprises architectural interface 122, identifying a modification by the VM to the state of the architectural feature of the virtual processor core, act 205 comprises, based on the modification to the state of the architectural feature of the virtual processor core, modifying the state of the architectural power management feature at the physical processor core. For example, when CPU control component 123 writes to a register at virtual core 115a, architectural interface 122 writes to a corresponding register at physical core 107a.

Referring to example 100c, in embodiments when act 204 comprises the para-virtual service identifying an API call from the para-virtual driver that requests a modification to the state of the architectural power management feature, act 205 comprises, based on identifying the API call from the para-virtual driver, modifying the state of the architectural power management feature at the physical processor core. For example, when para-virtual service 124 receives an API request from para-virtual driver 125 to modify a setting for a power management feature, para-virtual service 124 enacts that modification at power setting 108a.

In some embodiments, para-virtual service 124 does not track the modification to the state of the architectural power management feature at the physical processor core, and thus, para-virtual service 124 may be unable to revert the modification absent a processor restart. In other embodiments, para-virtual service 124 tracks the modification to the state of the architectural power management feature at the physical processor core. In these embodiments, para-virtual service 124 may later revert the modification to the state of the architectural power management feature at the physical processor core (e.g., based on the disassociation of the virtual processor core from the physical processor core).

Embodiments of the disclosure may comprise or utilize a special-purpose or general-purpose computer system (e.g., computer system 101) that includes computer hardware, such as, for example, a processor system (e.g., processor system 103) and system memory (e.g., memory 104), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 105). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EE-PROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links that can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 106), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (Saas), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from the view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor system, comprising:

identifying an architectural power management feature available at a physical processor core of the processor system, the physical processor core being associated with a virtual processor core of a virtual machine (VM) operating at the computer system;

presenting an interface to the VM, the interface exposing the architectural power management feature to the VM;

identifying, from the VM via the interface, a request from the VM for a modification to a state of the architectural power management feature;

modifying the state of the architectural power management feature at the physical processor core;

storing tracking data identifying the modification to the state of the architectural power management feature by the VM; and upon disassociation of the virtual processor core from the physical processor core, automatically reverting the state of the architectural power management feature to a prior state based on the tracking data.

2. The method of claim 1, wherein presenting the interface to the VM comprises presenting the architectural power management feature to the VM as an architectural feature of the virtual processor core.

3. The method of claim 2, wherein identifying the request from the VM to modify the state of the architectural power management feature comprises identifying a modification by the VM to a state of the architectural feature of the virtual processor core.

4. The method of claim 1, wherein presenting the interface to the VM comprises presenting a para-virtual service to the VM, the para-virtual service configured to communicate with a para-virtual driver operating at the VM.

5. The method of claim 4, wherein presenting the para-virtual service to the VM comprises exposing an application programming interface (API) to the VM, the API enabling the para-virtual driver to discover availability of the architectural power management feature.

6. The method of claim 4, wherein presenting the para-virtual service to the VM comprises exposing an application programming interface (API) to the VM, the API enabling the para-virtual driver to discover a parameter of the architectural power management feature.

7. The method of claim 4, wherein presenting the para-virtual service to the VM comprises exposing an application programming interface (API) to the VM, the API enabling the para-virtual driver to request a modification to the state of the architectural power management feature.

8. The method of claim 7, wherein identifying the request from the VM to modify the state of the architectural power management feature comprises identifying an API call from the para-virtual driver to the para-virtual service.

9. The method of claim 1, wherein the architectural power management feature is one of an idle state feature, a frequency scaling feature, or an overclocking feature.

10. A computer system comprising:

a processor system; and a computer storage media that stores computer-executable instructions that are executable by the processor system to at least:

identify an architectural power management feature available at a physical processor core of the processor system, the physical processor core being associated with a virtual processor core of a virtual machine (VM) operating at the computer system;

present a para-virtual service to the VM, the para-virtual service presenting an application programming interface (API) enabling a para-virtual driver operating at the VM to make API calls to manage the architectural power management feature;

at the para-virtual service, identify an API call from the para-virtual driver, the API call requesting a modification to a state of the architectural power management feature;

based on identifying the API call from the para-virtual driver, modify the state of the architectural power management feature at the physical processor core;

store tracking data identifying the modification to the state of the architectural power management feature by the VM; and upon disassociation of the virtual processor core from the physical processor core, automatically revert the state of the architectural power management feature to a prior state based on the tracking data.

11. The computer system of claim 10, wherein the architectural power management feature is one of an idle state feature, a frequency scaling feature, or an overclocking feature.

12. The computer system of claim 10, wherein the API enables the para-virtual driver to discover availability of the architectural power management feature.

13. The computer system of claim 10, wherein the API enables the para-virtual driver to discover a parameter of the architectural power management feature.

14. The computer system of claim 10, wherein the API enables the para-virtual driver to request the modification to the state of the architectural power management feature.

15. The computer system of claim 10, wherein the API call is a hypercall.

16. A computer system comprising:

a processor system; and a computer storage media that stores computer-executable instructions that are executable by the processor system to at least:

identify an architectural power management feature available at a physical processor core of the processor system, the physical processor core being associated with a virtual processor core of a virtual machine (VM) operating at the computer system;

present an interface to the VM, the interface exposing the architectural power management feature to the VM as an architectural feature of the virtual processor core;

identify, from the VM via the interface, a modification by the VM to a state of the architectural feature of the virtual processor core;

based on the modification to the state of the architectural feature of the virtual processor core, modify a state of the architectural power management feature at the physical processor core;

store tracking data identifying the modification to the state of the architectural power management feature by the VM; and upon disassociation of the virtual processor core from the physical processor core, automatically revert the state of the architectural power management feature to a prior state based on the tracking data.

17. The computer system of claim 16, wherein the architectural power management feature is one of an idle state feature, a frequency scaling feature, or an overclocking feature.

\* \* \* \* \*